United States Patent
Romar

(10) Patent No.: US 6,794,607 B2
(45) Date of Patent: Sep. 21, 2004

(54) TIG TORCH FINGER ELIMINATOR

(76) Inventor: Gerald Christopher Romar, 915 Bolden Rd., Palmetto, LA (US) 71358

( * ) Notice: Subject to any disclaimer, the term of this patent is extended or adjusted under 35 U.S.C. 154(b) by 0 days.

(21) Appl. No.: 10/104,719

(22) Filed: Mar. 25, 2002

(65) Prior Publication Data

US 2003/0178393 A1 Sep. 25, 2003

(51) Int. Cl.[7] ............................................. B23K 9/32
(52) U.S. Cl. ..................... 219/124.02; 219/75; 219/136
(58) Field of Search ...................... 219/75, 136, 124.02; 266/66, 68; 228/45

(56) References Cited

U.S. PATENT DOCUMENTS

| | | | | |
|---|---|---|---|---|
| 2,404,383 A | * | 7/1946 | Kornblutt | 219/124.22 |
| 3,698,701 A | * | 10/1972 | Straub | 266/66 |
| 4,263,497 A | * | 4/1981 | Cozzini | 219/138 |
| 4,688,770 A | * | 8/1987 | Keedy | 266/66 |
| 5,391,857 A | * | 2/1995 | Pompey | 219/124.31 |

* cited by examiner

Primary Examiner—Kiley Stoner
Assistant Examiner—Kevin P. Kerns

(57) ABSTRACT

The Tig Torch Finger Eliminator is attached to a tig torch to aid in welding pipes. It eliminates the use of the welder's fingers as a guide to stop tungsten contamination. It can be used in all positions of welding a pipe, and will take all the work out of walking the cup. It also gives maximum gas coverage and heat flow. The base plate comes in different sizes to fit different sizes of tig torches. It includes a handle base plate, which connects to a base extension. The base extension connects to the ball unit by a weld. The ball unit, having a beveled opening, will not let the ball fall out of its tip. The ball is held in place by a spring pushing against the ball and the spring retainer plate to allow pressure on the ball to keep it in place and allow it to move during welding.

1 Claim, 3 Drawing Sheets

TIG TORCH FINGER ELIMINATOR

CROSS-REFERENCE TO RELATED APPLICATIONS

"Not Applicable"

STATEMENT REGARDING FEDERALLY SPONSORED RESEARCH AND DEVELOPMENT

"Not Applicable"

INCORPORATION-BY-REFERENCE OF MATERIAL SUBMITTED ON A COMPACT DISC

"Not Applicable"

BACKGROUND OF THE INVENTION (1) Field of the Invention

This present invention, the tig torch finger eliminator, relates to pipe welding. When welding on a pipe, welders oftentimes place their fingers on a pipe to eliminate filler metal from gathering on the tungsten. If the tungsten gets contaminated, which breaks up the current of the arc flow, also causing low heat flow. This invention will eliminate this problem and give the welder some added benefits as follows: provide the welder to have a more stability when welding, provide a welder to run stringers in all positions without putting friction on the welder's wrist and shoulders, provide the welder from changing of the gas cup when welding a root, hot filler, or a cap on heavy wall pipes, provide the welder with less work in walking the cup in all positions, and provide the welder to weld in a more sufficient time.

(2) Description of the Related Art

Welding guides in the past have been dealing with mainly cutting torches and plate welds.

For example the cutting torch tip guide which is illustrated in U.S. Pat. No. 3,698,701 is relating to a new and useful improvement of a nozzle type cutting torch tip attachment, deals with cutting metal sheet and the circumference of a pipe.

A guide assembly for a cutting torch tip is described in U.S. Pat. No. 4,688,770, refers to a cutting torch tip and guide to be used with a hand held cutting torch.

A guide wheel arrangement U.S. Pat. No. 2,404,383, relates to welding devices and fillet welding devices. Such welding devices as tracking machines for T-beams. It provides an improved apparatus for controlling a welding tool.

The welding guide U.S. Pat. No. 4,263,497 relates to aligning the welding head with the joint as the weld progresses, when welding a joint along an outside corner or edge of a plate weld.

Another patent of interest is the welding tip roller guide U.S. Pat. No. 5,391,857. This invention relates to supporting a welding tip at a predetermined distance from a corner or other area of the work place, which refers to a plate weld.

While these devices fulfill their respective, particular objective and requirements, these patents do not describe the tig torch finger eliminator, which is used with a tig torch for pipe welding. The main function of the tig torch finger eliminator is to help stop filler metal from getting on the tungsten while welding pipe. By which, the welder will get a maximum heat flow, allowing the welder to make a more effective and smoother weld.

BRIEF SUMMARY OF THE INVENTION

The invention is a tool which includes straps which hold the handle base plate to the tig torch. A base extension is necessary to hold the handle base plate and give the ball unit a support, while not being so close to the handle base plate. The ball unit holds the ball, that will be used on the weld surface. The tool is connected to the tig torch to aid in welding pipes. Tungsten can get very contaminated while putting filler in pipe, also the pipe can get very hot, which makes it difficult to put fingers on pipe to help stop filler metal from getting on the tungsten. This invention will allow the welder to eliminate the use of his fingers. Instead of putting a finger on the pipe, the welder puts the ball part of the tig torch finger eliminator on the weld surface that is about to be welded. After ignition has taken place, using the ball part, begin to work the tig torch head in the desired area that you want to weld. This will help the welder to make a more effective and smooth weld, less contamination to the tungsten and with less strain on the body. It also helps a welder to eliminate walling the cup when welding.

BRIEF DESCRIPTION OF THE SEVERAL VIEWS OF THE DRAWINGS

FIG. 2. The view of the tig torch eliminator showing the different parts it is comprised of.

DETAILED DESCRIPTION OF THE INVENTION

Figure 1:
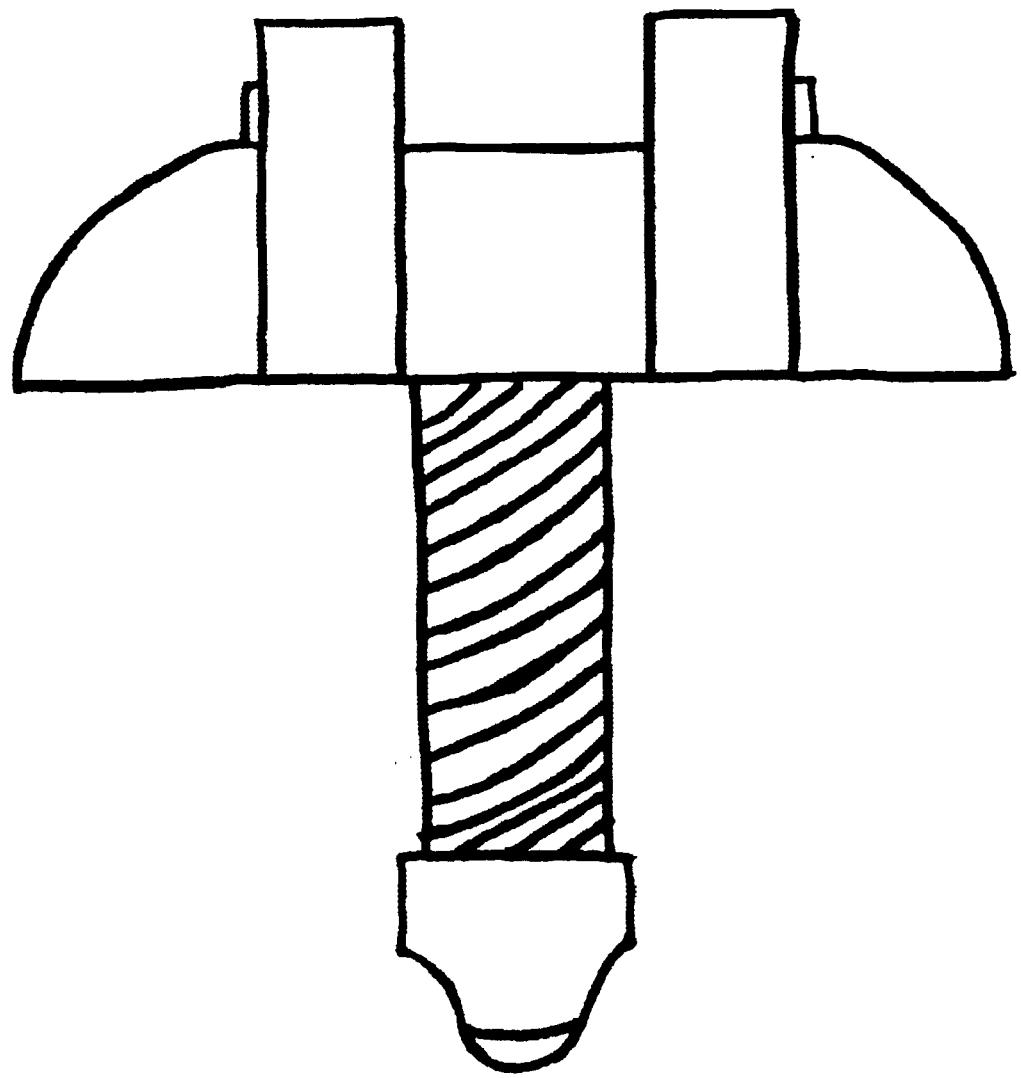
FIG. 1. The front view of the tig torch eliminator without being attached to the tig torch.
Figure 2:
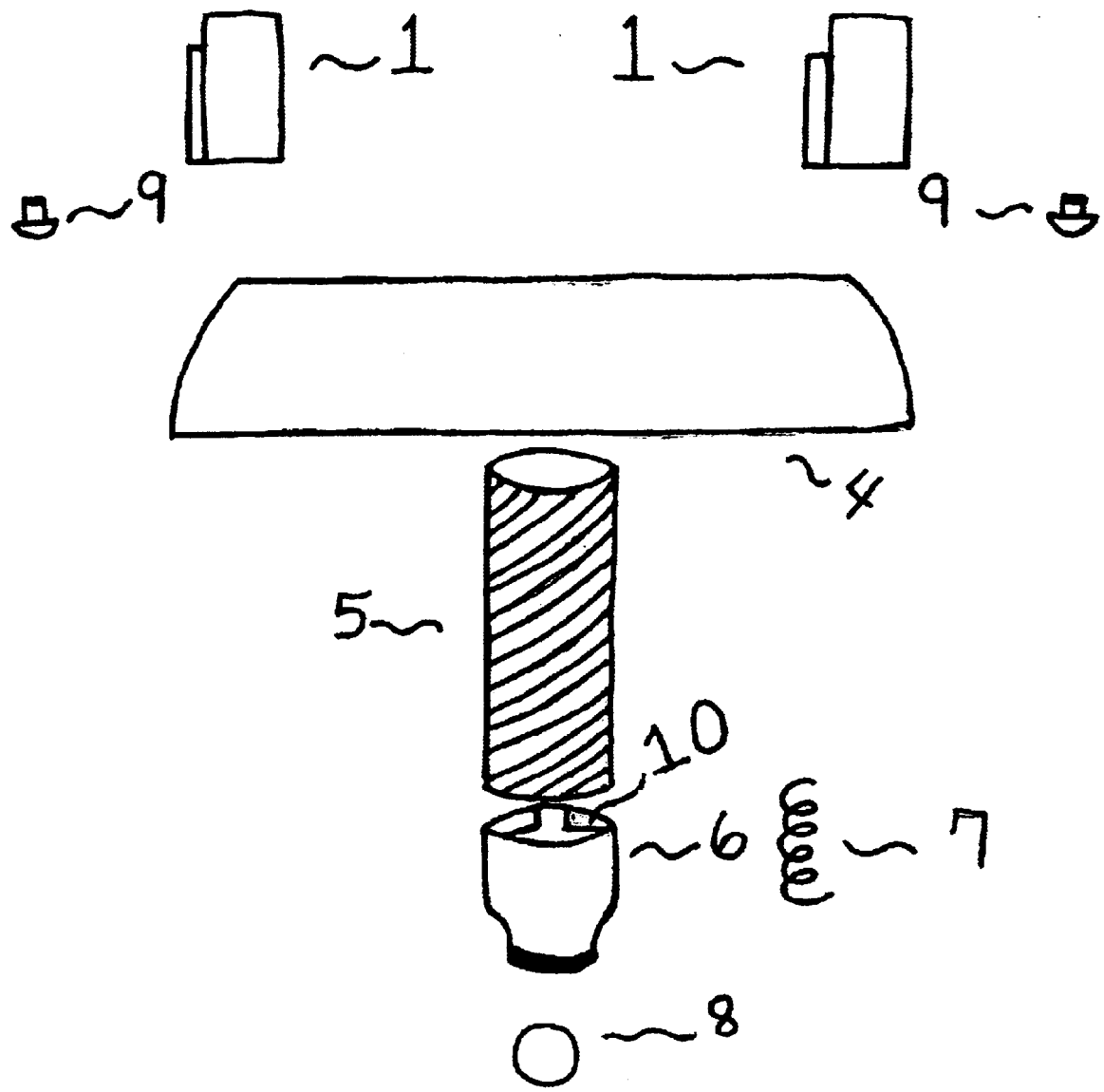
Figure 3:
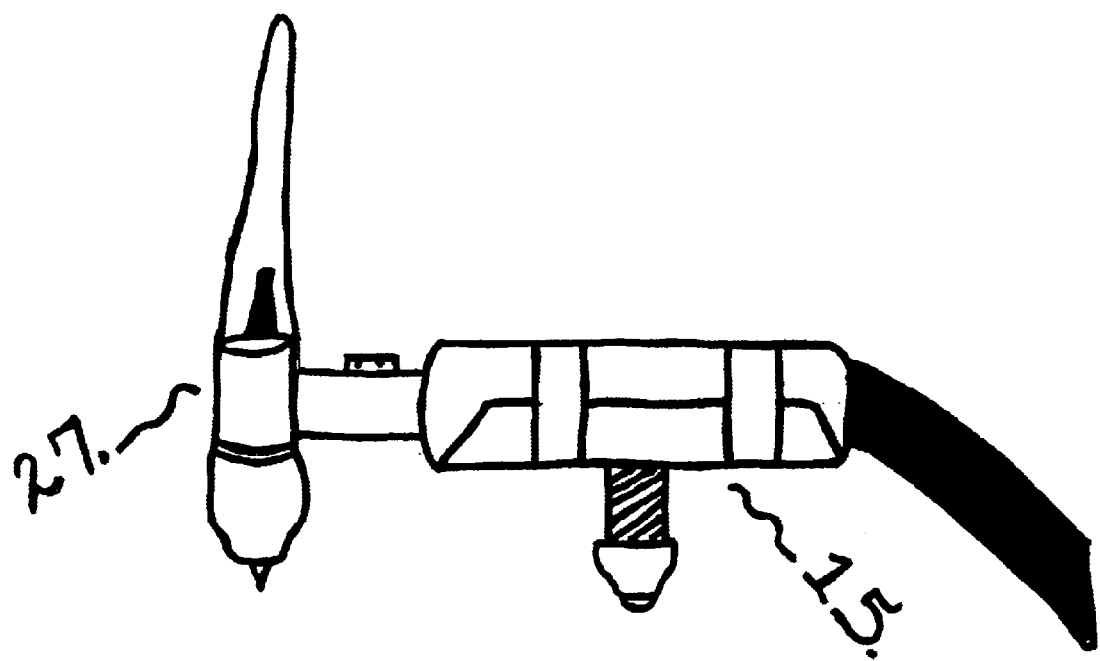
FIG. 3. The view of the tig torch eliminator connected to the tig torch.

The tig torch finger eliminator of FIG. 1 consists of two straps 1 on (see FIG. 2), which is connected to the handle base plate 4, (which will come in different sizes to fit on handle 15 of different sizes of tig torch 27, as shown in FIG. 3 with rivets 9 securing straps 1 (see FIG. 2). The handle base plate 4 is welded to the base extension 5. The base extension 5 is connected to the ball unit 6 by a weld. The ball unit 6 opening is beveled, which allows the ball 8 to sit in without falling out. It is further comprised of a spring 7 which is located inside the ball unit 6. The spring 7 sits upon the top of the ball 8, with the top of the spring 7 pushed on the little spring retainer plate 10 that is located on the top of the ball unit 6 which allows pressure on the ball to keep it in place and enables the ball to move when on a weld surface.

SEQUENCE LISTING

"Not Applicable"

I claim:

1. A torch handle supporting and guiding attachment for a welding torch, comprising:

a handle base plate having an inner surface in which a torch handle rests, the handle base plate further comprising two straps that are attached to the torch handle;

a base extension connected to an outer surface of the handle base plate and extending outwardly therefrom; and a ball unit containing a ball and a spring to apply pressure to the ball and to keep the ball securely in place, wherein the ball unit has a beveled opening that holds the ball and attaches to the base extension, so that the ball under pressure from the spring is adapted to contact a welding surface during a welding operation.

* * * * *